United States Patent [19]

Scheps et al.

[11] Patent Number: 5,737,347
[45] Date of Patent: Apr. 7, 1998

[54] LASER WITH MULTIPLE GAIN ELEMENTS

[75] Inventors: Richard Scheps, Del Mar; Joseph F. Myers, San Diego, both of Calif.

[73] Assignee: The United States of America as represented by the Secretary of the Navy, Washington, D.C.

[21] Appl. No.: 607,036

[22] Filed: Feb. 26, 1996

Related U.S. Application Data

[63] Continuation of Ser. No. 155,034, Nov. 19, 1993, Pat. No. 5,528,612.

[51] Int. Cl.[6] ....................................... H01S 3/10
[52] U.S. Cl. ................................... 372/23; 372/97
[58] Field of Search ................................ 372/23, 97

[56] References Cited

U.S. PATENT DOCUMENTS

| | | | |
|---|---|---|---|
| 4,025,172 | 5/1977 | Freiberg | 372/97 |
| 4,287,486 | 9/1981 | Javan | 372/97 |
| 4,475,198 | 10/1984 | Curtis et al. | 372/23 |
| 4,794,605 | 12/1988 | Aprahamian et al. | 372/97 |
| 5,052,013 | 9/1991 | Putnam | 372/97 |
| 5,077,750 | 12/1991 | Pocholle et al. | 372/97 |
| 5,235,605 | 8/1993 | Rines et al. | 372/23 |
| 5,325,393 | 6/1994 | Nighan et al. | 372/97 |
| 5,345,457 | 9/1994 | Zenzie et al. | 372/23 |
| 5,351,262 | 9/1994 | Poguntke et al. | 372/97 |
| 5,375,132 | 12/1994 | Connors et al. | 372/97 |

*Primary Examiner*—Rodney B. Bovernick
*Assistant Examiner*—Robert E. Wise
*Attorney, Agent, or Firm*—Harvey Fendelman; Michael A. Kagan; Eric James Whitesell

[57] ABSTRACT

A tunable laser produces laser emission at at least two wavelengths simultaneously. The tunable laser includes at least two gain elements, where each gain element generates a different wavelength. Means for optically exciting each laser gain element is appropriately disposed for either end pumping or side pumping to produce a laser emission within a preselected range of wavelengths. A wavelength dispersing element such as a prism is disposed in the laser resonator cavity for dispersing the wavelengths operating simultaneously within the laser resonator cavity and to create separate regions for each laser gain element. Laser gain elements may be tunable laser gain elements or discrete emitting laser gain elements. Arbitrarily large wavelength separations between the wavelengths operating simultaneously may be achieved in this manner producing stable cw or pulsed output, Q-switched or line narrowed depending on the means disposed within the laser resonator cavity. In addition, intracavity sum frequency generation can be produced efficiently at a laser resonator waist in which a non-linear sum frequency generating crystal is disposed by having separate gain elements for each wavelength. Problems associated with gain competition are reduced or eliminated. The multiple gain elements may be of different materials or the same material.

4 Claims, 2 Drawing Sheets

LASER WITH MULTIPLE GAIN ELEMENTS

This is a continuation of application Ser. No. 08/155,034 filed Nov. 19, 1993, now U.S. Pat. No. 5,528,612.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to lasers and non-linear frequency conversion techniques, and particularly to a technique for producing two or more wavelengths simultaneously which are converted to a third wavelength using intracavity sum frequency generation.

Lasers are well-known devices that produce monochromatic optical radiation. Extremely narrow optical bandwidths can be obtained, and laser emission with a spectral purity approaching one part in $10^{14}$ has been demonstrated. However, the single emission wavelength, which for many applications is an important advantage that lasers possess, can also be a serious drawback. For example, numerous applications require specific, discrete wavelengths. In many instances there is no laser transmitter that operates at that specific wavelength. Tunable lasers are highly suited to this type of application.

Tunable lasers can be either discretely tunable, by which is meant two or more specific wavelengths can be obtained from a given laser, or continuously tunable, by which is meant that over a certain band (or preselected range) of wavelengths any arbitrarily selected wavelength may be obtained. In addition, with continuously tunable lasers the emission bandwidth can be made extremely narrow to provide the possibility of obtaining truly monochromatic optical radiation from a given laser over a wide wavelength band.

Dye lasers are one example of a class of lasers that are continuously tunable. The range of tunability is typically less than 100 nm, and dye lasers are well-known to produce extremely narrow output bandwidths. Dye lasers operate in the wavelength range of approximately 400 nm to 750 nm. Dyes operating beyond 800 nm are usually unstable and are in general impractical. To cover the wide bandwidth range of 400 nm to 750 nm, typically five to six different dyes are needed.

While dye lasers and other continuously tunable lasers can be useful for applications requiring a discrete wavelength, other applications may require more than one wavelength simultaneously. Such applications include resonant two-photon spectroscopy, for example, or sum frequency generation (SFG). For SFG a non-linear optical crystal is utilized to produce an emission at a wavelength by summing the frequencies of radiation at two different wavelengths. If the two fundamental wavelengths are represented by $\lambda_1$ and $\lambda_2$, then the sum frequency wavelength, $\lambda_3$, is given by the expression:

$$\frac{1}{\lambda_1} + \frac{1}{\lambda_2} = \frac{1}{\lambda_3} . \quad (1)$$

One can see from Equation 1 that $\lambda_3$ is smaller than either $\lambda_1$ or $\lambda_2$. This technique is used commonly to obtain visible emission from infrared (IR) emitting lasers.

There are several types of lasers which have been demonstrated to produce two wavelengths simultaneously. Early demonstrations of multifrequency devices concentrated on pulsed dye lasers, see for example, H. S. Pilloff, "Simultaneous Two-wavelength Selection in the $N_2$ Laser Pumped Dye Laser," *Applied Physics Letters*, vol. 21, pp. 339–340, 1972; C. Wu and J. R. Lombardi, "Simultaneous Two-frequency Oscillation in a Dye Laser System," *Optical Communications*, vol. 7, pp. 233–236, 1973; and H. Lotem and R. T. Lynch, Jr., "Double Wavelength Laser," *Applied Physics Letters*, vol. 27, pp. 344–346, 1975.

The techniques used to demonstrate multifrequency dye lasers were generally oriented toward pulsed laser systems. These techniques typically use inefficient means to separate and tune the wavelengths and are not suitable for continuous wave (cw) operation. More recently, a titanium-doped sapphire (Ti:sapphire) laser was demonstrated to operate cw multifrequency. This laser uses a tunable solid state laser gain element which operates over the wavelength range of about 680 nm to about 1.1μ and is ideally suited for a number of applications that previously had used dye lasers. As mentioned above, some laser dyes that emit in the near-IR range, roughly speaking 700 nm to 1μ, tend to be unstable. The Ti:sapphire laser is a much more practical way of achieving cw tunable operation in this wavelength range. The Ti:sapphire gain element is a crystalline material that is typically shaped as a cylindrical laser rod with Brewster angle end faces.

The demonstration of a doubly resonant cw Ti:sapphire laser was recently reported in the literature, see for example, R. Scheps and J. F. Myers, "Doubly Resonant Ti:sapphire Laser," *IEEE Photonics Technology Letters*, vol. 4, pp. 1–3, 1992. This same gain element, Ti:sapphire, had also previously been demonstrated to operate simultaneously at two wavelengths ("multifrequency") in a pulsed mode similar to the type of operation that had been previously obtained in dye lasers, see for example, C. Kruglik, P. N. Nazarenko, N. V. Okldnikov, F. A. Skripko and A. A. Stavrov, "Autonomous Tunable Multifrequency Near-IR Laser," *Atmospheric Optics*, vol. 2, pp. 729–734, 1989; and S. G. Bartoshevich, I. V. Mikhnyuk, F. A. Skripko and I. G. Tarazevich, "Efficient Difference Frequency Oscillator Based on a Ti:sapphire Laser," *IEEE Journal of Quantum Electronics*, vol. 27, pp. 2234–2237, 1991.

Multifrequency operation of a tunable laser is desirable when there is independent wavelength and bandwidth control of each output wavelength. Such a device can be used more readily for numerous application. A U.S. Pat. No. 4,287,486 entitled "Laser Resonator Cavities with Wavelength Tuning Arrangements" by Ali Javan discusses various means of using tunable gain media to obtain multifrequency operation. All wavelengths in the Javan laser can emerge collinearly. Independent control of wavelength and spatial separation between wavelengths is provided. There are several apparent limitations in Javan's patent related to the wavelength tunability technique employed in that patent and the spatial transverse mode control of such a device.

Regardless of the technique used to achieve simultaneous multifrequency operation in the types of lasers discussed above, be it pulsed or cw, discretely tunable or continuously tunable, all limit emissions to a preselected range of wavelengths over which the gain material demonstrates optical gain. The gain of a given laser material at a specific wavelength is determined by the stimulated emission cross-section, σ. Numerous factors determine the spectral dependence of the stimulated emission cross-section. For a laser to have the ability to operate at a given wavelength, the gain experienced at that wavelength must exceed the sum of all losses incurred. Losses are due to such factors as transmission through the resonator (output coupling), scattering and absorption.

The Ti:sapphire laser operating between 680 nm and 1.1µ has one of the largest tuning ranges of any known laser material. Other gain materials such as $Cr^{3+}$-doped solid state materials and dye lasers have much narrower tuning ranges, typically on the order of 80 nm to 200 nm. If simultaneous dual wavelength operation is desired in a given laser at two wavelengths for which no known gain material demonstrates gain, the techniques previously described cannot be used to generate such a device.

Non-linear optical conversion is commonly used to produce visible radiation from solid state lasers operating in the near infrared. The most common non-linear optical conversion technique is a process called second harmonic generation, or doubling. In the doubling process the laser output is directed through a non-linear material, generally a crystal. The laser beam emerging from the non-linear crystal is at one-half the wavelength of the initial laser beam (i.e., the optical frequency is doubled). The initial laser wavelength is referred to as the "fundamental wavelength" and the shorter wavelength is often called the "second harmonic".

An important parameter for efficient non-linear conversion is phase matching. Optimum conversion from the fundamental wavelength to the second harmonic wavelength will occur when the wave vector mismatched between the fundamental wave and the generated wave is zero. This condition is termed "phase matching". Phase matching may be achieved in an anisotropic crystal by a suitable choice of direction of the propagation relative to the crystalline axes.

Two different types of second harmonic generation (SHG) can occur in non-linear crystals. The second harmonic process can be thought of as mixing two waves of identical wavelength to produce a third wave at one-half the wavelength. In this context, Type I SHG refers to the process where the two fundamental waves have the same polarization. Type II SHG occurs when the fundamental waves have orthogonal polarizations.

Phase matching is achieved as a result of the dispersion of the non-linear crystalline material. Dispersion refers to the dependence of the refractive index of a given material on wavelength. Phase matching is achieved in second harmonic generation when the refractive index at the fundamental wavelength is equal to the refractive index at the second harmonic wavelength. Because of dispersion, the refractive indices at the two wavelengths can be equal if the material is birefringent. That is, the crystal must have a different refractive index for the ordinary and extraordinary waves. In this case a propagation direction may be chosen with respect to the crystallographic axes where for a given fundamental wavelength the refractive indices for the second harmonic the fundamental wavelengths are identical.

The conditions for phase matching depend specifically on the desired non-linear operation. For example, second harmonic generation of the Nd:YAG laser wavelength from 1,064µ to 532 nm requires that the refractive index of the non-linear crystal at 1,064µ and the refractive index at 532 nm be identical. In such a case, the phase relationship between the fundamental wavelength and the generated second harmonic wavelength remain unchanged as the two waves propagate along the length of the non-linear crystal.

When phase matched second harmonic generation is achieved by propagating the fundamental wavelength along a direction different from a principal axis of a birefringent crystal, it is termed "critical phase matching". When critically phase matched second harmonic generation is obtained with a focused beam, there is a phase mismatch of the wave vector for small deviations from the phase matched direction due to the finite divergence of the beam. However, since the efficiency of the non-linear conversion process is a function of the power density within the non-linear crystal, focusing is generally desirable to achieve high conversion efficiency.

When the phase matching angle is 90° for a particular non-linear process in a given material, it is termed "non-critical phase matching" (NCPM). In such a case, effects of beam divergence vanish. That is to say, a strongly focused beam in an NCPM crystal does not have the phase mismatch problems as is evident in critical phase matching. In addition, the walk-off angle, which is the direction of energy flow of the fundamental and second harmonic beams, is zero. This allows the two beams (the fundamental and second harmonic) to propagate collinearly within the crystal.

NCPM is therefore a desirable and potentially highly efficient type of phase matching. One means by which NCPM can be obtained is by adjusting the temperature of the non-linear crystal to the point where the refractive index of the fundamental wavelength equals that of the second harmonic wavelength for a particular propagation direction with respect to the crystallographic axes. NCPM can also be achieved at room temperature for a given non-linear material and fundamental wavelength. Room temperature NCPM has the advantage of simplicity.

Second harmonic generation is a special case of a more general non-linear optical conversion process known as sum frequency generation. In second harmonic generation, two optical waves of the same wavelength are combined to produce a single wave of a wavelength one-half the original fundamental wavelength. In sum frequency generation, two fundamental waves of different wavelengths are combined to produce a third wavelength. The wavelength produced by sum frequency generation is determined by equation (1). Second harmonic generation is a degenerate case of sum frequency generation since for second harmonic generation $\lambda_1=\lambda_2$. The fundamental principles of non-linear optics summarized briefly above are well known and are discussed in detail in the literature, see for example, G. D. Boyd and D. A. Kleinman, *Journal of Applied Physics*, vol. 39, p. 3597, 1968.

Sum frequency generation (SFG) can in principle be more efficient than second harmonic generation (SHG) under certain conditions. If a wavelength $\lambda_3$ is desired, it can be obtained by SFG using a particular $\lambda_1$ and $\lambda_2$ labeled $\lambda_{o1}$ and $\lambda_{o2}$. Obtaining $\lambda_3$ by SHG requires a fundamental wavelength $\lambda_1$ (equal to $\lambda_2$) equal to $2\lambda_3$. If the wavelength $2\lambda_3$ is not near the peak wavelength for a given laser, then the efficiency of producing $2\lambda_3$ will be extremely low. It is often the case that $2\lambda_3$ is not near the peak emission wavelength or cannot be produced efficiently.

In addition, note that for power scaling it is difficult to operate a laser at high power when it is tuned substantially off the peak output wavelength. If $2\lambda_3$ is obtained from a laser for which the stimulated emission cross-section at $2\lambda_3$ is substantially lower than the peak stimulated emission cross-section, the peak stimulated emission cross-section wavelength may in fact be emitted even though the laser is tuned to operate at $2\lambda_3$.

On the other hand, using SFG it may be possible to identify two lasers such that $\lambda_{o1}$ and $\lambda_{o2}$ represent wavelengths for each laser which are at, or close to, the wavelengths for which the spectral dependence of the stimulated emission cross-section have a peak. Then the production of $\lambda_3$ by summing $\lambda_{o1}+\lambda_{o2}$ has significant advantages compared to the case where one must double the frequency at wavelength $2\lambda_3$, for which the stimulated emission cross-section might be substantially lower than that at the peak. In general, sum frequency generation requires two lasers, and this has problems in terms of alignment since beam spot sizes in the non-linear crystal must be quite small for efficient sum frequency generation.

An example of efficient sum frequency generation is given by the summation of the wavelengths 808 nm and 1,064μ to produce 459 nm. The non-linear crystal KTiOPO$_4$ (KTP) is non-critically phase matched at room temperature for sum frequency generation at these two wavelengths, see for example K. Kato, *IEEE J. Quantum Electronics*, vol. QE-24, p. 3, 1988. Since 1,064μ is the peak wavelength for Nd:YAG lasers and 808 nm is near the peak wavelength of several Cr$^{3+}$-doped solid state lasers as well as AlGaAs laser diodes and Ti:sapphire lasers, the sum frequency generation process can proceed quite efficiently using these two wavelengths to produce 459 nm.

On the other hand, achieving 459 nm through SHG requires that a laser be designed to produce 918 nm output. This wavelength is difficult to generate efficiently as only a few tunable lasers cover this wavelength range. In addition, 918 nm is not near the peak for the stimulated emission cross-section of any efficient, scalable laser. Furthermore, doubling 918 nm generally uses non-linear crystalline materials that are not as mature as KTP, such as KNbO$_3$. KNbO$_3$ is far less robust or mature than KTP. Finally, it is difficult to obtain a high quality crystal which is non-critically phase matched at room temperature for second harmonic generation from 918 nm to 459 nm.

Typically, as mentioned above, SFG requires two different laser sources. Since the efficiency of the sum frequency generation process depends upon the power density (power per unit area) within the non-linear optical crystal, extremely small focused spot sizes within the non-linear sum frequency generating crystal are desirable. Using two different laser sources generally leads to problems involving the alignment of the beams to the high degree of accuracy required by these small spot sizes within the non-linear crystal. In addition, when using two separate laser sources, there are inefficiencies that result from mismatching the spatial intensity distribution at the beam focus from the two lasers in terms of size, shape and intensity distribution.

It should be noted that for cw sum frequency generation the use of the non-linear SFG crystal within a resonator ("intracavity") is essentially a requirement which stems from the necessity of having very high power densities to achieve efficient generation of the SFG output. Therefore, the non-linear crystal used for cw SFG usually receives focused light within a laser resonator cavity. Using a non-linear crystal inside a laser resonator cavity is desired because of the high circulating optical flux within a laser resonator cavity. The intracavity optical power is forced by highly reflective end elements to oscillate back and forth and will therefore have a much higher power than light outside of the cavity. Note also that when a single resonator is used to resonate both fundamental wavelengths $\lambda_1$ and $\lambda_2$ used for SFG, there should be no elements contained within the cavity that are strongly absorbing at either wavelength. Although good efficiency dictates the use of intracavity sum frequency generation to take advantage of the high circulating power at the fundamental wavelengths $\lambda_1$ and $\lambda_2$ for cw operation, for pulsed operation one can place the non-linear optical crystal external to the laser resonator cavity and still obtain good sum frequency generation efficiency. However, in all cases small spot sizes within the laser crystal are desirable to enhance the conversion efficiency by increasing the power density. The maximum sustainable power density is determined by laser-induced optical damage to the crystal or optical coatings on the crystal faces. Efficient SFG requires good alignment and good spatial mode matching between the beams representing the two fundamental wavelengths, $\lambda_1$ and $\lambda_2$.

Many of these problems can be overcome if both $\lambda_1$ and $\lambda_2$ are produced by a single laser which can operate at two wavelengths simultaneously. In general, in order to achieve simultaneous operation at both wavelengths, the net round-trip gain at each wavelength must be comparable within the laser resonator cavity. However, the spectral dependence of the stimulated emission coefficient for a given laser material (which determines the intrinsic gain of the material) makes it unlikely that the net gain would be the same at both fundamental wavelengths for the SFG process, particularly if the two wavelengths are widely separated.

Thus, in accordance with this inventive concept a continuing need has become apparent in the state of the art for an operational laser operating simultaneously at two or more wavelengths and in which the simultaneously operating wavelengths are separated by an arbitrarily large wavelength range, and which by the insertion of a non-linear sum frequency generating crystal can produce a third wavelength which is the sum frequency of the first two wavelengths. In addition, in accordance with this inventive concept a continuing need has been found in the state of the art for a laser for producing two wavelengths to be used for sum frequency generation or other applications where the separation between the two wavelengths is arbitrarily large, where the power available can be scaled to higher power, which produces efficient sum frequency generation and is insensitive to alignment, where the spatial modes at both wavelengths are approximately identical, which can be pumped by any suitable optical means and can be used for intracavity sum frequency generation in a cw or pulse mode, and where no elements are contained within the laser resonator cavity that reduce the intracavity power at either fundamental wavelength $\lambda_1$ or $\lambda_2$.

SUMMARY OF THE INVENTION

The present invention is directed to providing a laser which operates at two or more wavelengths simultaneously, each wavelength emanating from a separate and distinct gain element contained within the laser resonator and furthermore, containing an overlapping region in which all wavelengths produced simultaneously are overlapped and spatially superimposed and in which an intracavity sum frequency generating crystal can be inserted.

The laser resonator is made up of two or more, plane or curved reflective elements to form a reflective path and define a laser resonator cavity. Two or more laser crystals or laser gain elements are disposed in the reflective path in the laser resonator cavity and means for optically exciting the laser crystals are appropriately disposed to pump the laser crystals to produce laser emissions in a preselected range of wavelengths. A wavelength dispersion element such as a prism is disposed in the reflective path in the laser resonator cavity to provide a spatially separate path for each of the wavelengths and to determine the specific laser wavelengths produced simultaneously by the laser. The laser resonator cavity mode is collimated as it passes through the prism to optimize the wavelength dispersion performance of the prism.

Elements for line narrowed operation at one or more wavelengths, and shutters, apertures or the like to prevent operation temporarily at one or more wavelengths may be provided. Optically exciting each laser crystal in an end pumping mode creates a "gain aperture" in each laser crystal which allows the laser to operate only in the lowest order spatial transverse mode at the desired wavelength in the preselected range of wavelengths. The design of the laser resonator cavity provides spatial separation of the various wavelengths and multiple gain elements operating simultaneously in one part of the laser resonator cavity, and yet provides collinear superposition of all of the laser wavelengths produced simultaneously in another part of the laser resonator cavity. Performance of the intracavity prism is enhanced if the prism is a Brewster angle dispersive prism placed in minimum deviation.

A non-linear sum frequency generating crystal can be placed within the laser resonator cavity in the region where the multiple simultaneously operating wavelengths are superimposed, allowing the sum frequency generated wavelength to be efficiently produced. In the case of SFG, two gain elements producing the two fundamental wavelengths are the optimum number of gain elements and the optimum number of simultaneous fundamental wavelengths. Separate feedback paths are established for each wavelength which operates simultaneously. The separate feedback paths which are determined by the position and location of the intracavity Brewster angle prism also establish the optimum location of the multiple gain elements within the laser resonator cavity. In this section of the laser resonator cavity spatially distinct, separate paths for the two or more wavelengths are established. In addition, the laser radiation may be linearly polarized and may contain a polarization rotating plate capable of rotating the polarization of one of more wavelengths operating simultaneously within the laser resonator cavity with respect to the others. This wave plate can furthermore be appropriately located in the laser resonator cavity when only two fundamental wavelengths are operating simultaneously so that the polarization of the two fundamental wavelengths are orthogonal as they pass through the non-linear sum frequency generating crystal, but are parallel as they pass through other regions of the laser resonator cavity. The orthogonal orientation of the polarization of the two wavelengths, in the non-linear crystal is required for a Type II SFG.

In the region where the two fundamental wavelengths are spatially overlapped a laser resonator cavity focus is established by suitable placement of reflective elements within the laser resonator cavity. At the location of this laser resonator cavity focus, a non-linear optical crystal is placed for the purpose of generating the sum frequency wavelength from two fundamental wavelengths oscillating within the laser resonator cavity.

The gain element may be end pumped or side pumped. For efficient end pumping a laser resonator cavity waist should be established at one face of each laser gain element. This face is coated to be highly reflective (HR) at the laser resonator wavelength and simultaneously, highly transmissive (HT) at the optical pump wavelength. In this manner, a gain aperture is established and $TEM_{00}$ operation, which is to say the lowest order spatial transverse mode, is insured.

Appropriate coatings are placed on all reflective and transmissive elements to reduce the loss at all laser wavelengths which are resonated within the cavity. In addition, one or more reflective elements may be coated to partially transmit one or more of the fundamental wavelengths or, alternatively, to partially or completely transmit the sum frequency generated wavelength. The spatial intensity profile, or alternately, the transverse mode structure, of each of the fundamental wavelengths produced by each of the multiple gain elements contained within the laser cavity is almost identical. Therefore, a natural spatial mode matching is provided which further enhances the sum frequency generation efficiency.

OBJECTS OF THE INVENTION

Accordingly, an object of the invention is to provide a laser which produces two or more wavelengths simultaneously wherein each wavelength originates in a different gain element contained within the laser resonator cavity.

Another object of the invention is to provide a dual wavelength laser that operates at two wavelengths simultaneously and converts the intracavity flux at the two fundamental wavelengths to a third wavelength by a means of intracavity sum frequency generation.

Another object of the invention is to provide a tunable laser having the capability of operating at two or more wavelengths simultaneously in which each wavelength can be tuned independently of the other.

Another object of the invention is to produce efficient sum frequency generation in a dual wavelength laser by creating a waist or focus in the laser resonator cavity mode and locating the non-linear SFG crystal at said waist.

Another object of the invention is to provide a tunable laser which allows an arbitrarily large wavelength separation between the two wavelengths operating simultaneously.

Another object of the invention is to provide a multiple wavelength laser which can operate Q-switched where the pulse occurring at each wavelength occurs at the same time.

Another object of the invention is to provide a tunable multi-wavelength laser that operates at two or more wavelengths simultaneously and lases in the lowest order spatial transverse mode ($TEM_{00}$) at all wavelengths over a preselected wavelength range.

Another object of the invention is to provide a tunable laser which produces laser emission at two or more wavelengths simultaneously and which can be pumped by laser diodes.

Another object of the invention is to provide a tunable laser which operates at two or more wavelengths simultaneously and in which the laser resonator cavity mode contains a collimated region and in which a dispersive prism can be placed in a minimum deviation configuration.

Another object of the invention is to provide a laser operating simultaneously at two or more wavelengths and contains a region in the laser resonator cavity in which there are separate and spatially distinct feedback paths for each wavelength.

Another object of the invention is to provide a laser which operates at two or more wavelengths simultaneously and in which a laser waist is created in a region where both wavelengths are superimposed spatially.

Another object of the invention is to provide a line narrowed tunable laser which produces simultaneous output at two or more frequencies, the bandwidth of each frequency being substantially narrowed by the insertion of intracavity narrowing elements.

Another object of the invention is to provide a laser which contains two or more laser gain elements in which a focus or waist is created at one face of each laser gain element and furthermore which can be end pumped by an optically exciting means to produce the lowest order $TEM_{00}$ laser mode.

Another object of the invention is to provide a laser operating at two wavelengths simultaneously and further containing a means for generating tunable sum frequency generated output by adjusting the wavelength of one or both fundamental wavelengths.

Yet another object of the invention is to provide a tunable laser which operates at two or more wavelengths simultaneously and in which the laser resonator cavity mode contains a region where at least two wavelengths are spatially overlapped and superimposed, that region further containing a non-linear crystal for sum frequency generation such that the at least two superimposed wavelengths produced simultaneously are spatially superimposed within the non-linear sum frequency generating crystal.

These and other objects of the invention will become more readily apparent from the ensuing specification and drawings when taken in conjunction with the appended claims.

DETAILED DESCRIPTION OF THE PREFERRED EMBODIMENTS

Figure 1:
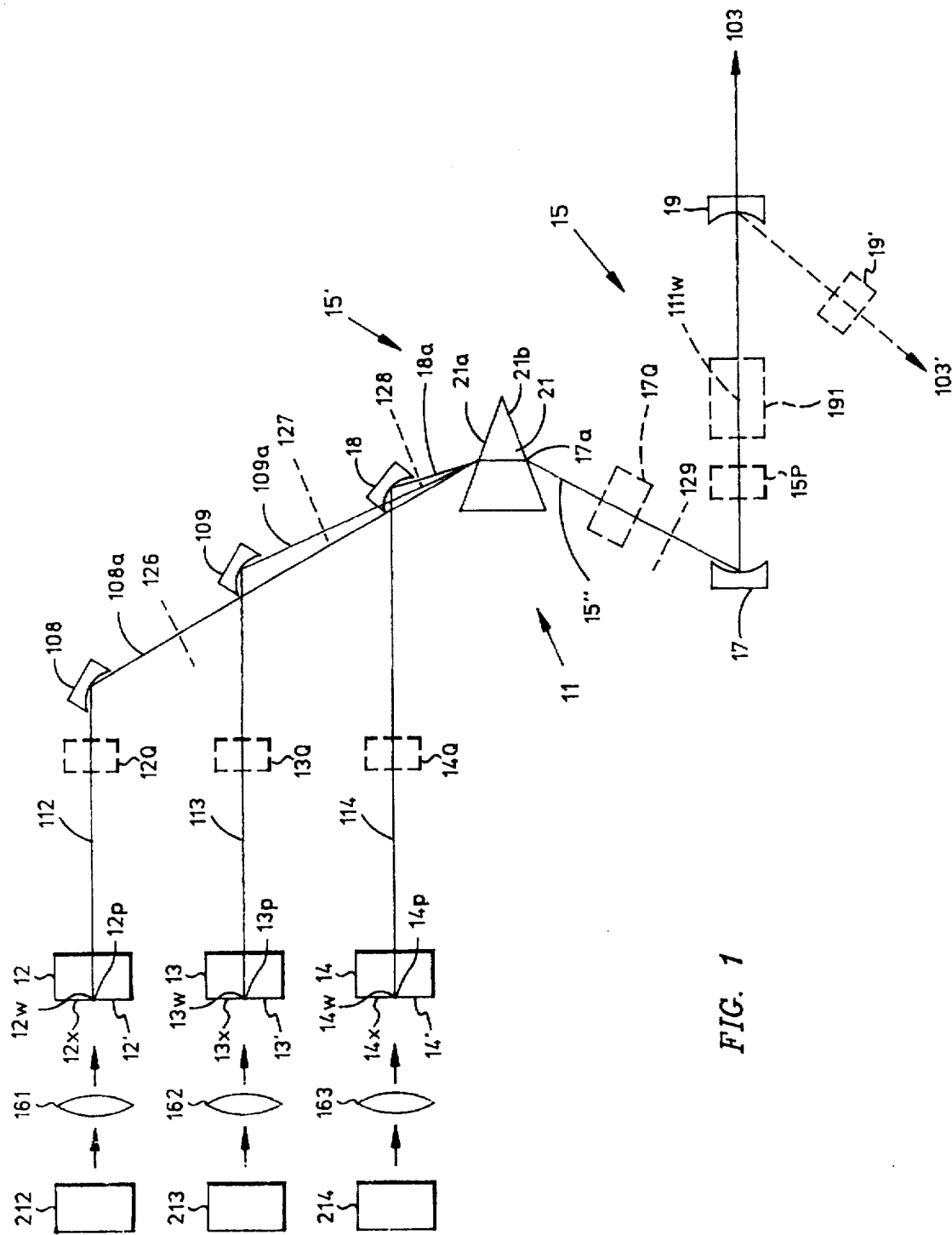
FIG. 1 represents a first embodiment of the invention.

This inventive concept involves the implementation of an optical laser resonator cavity that will allow simultaneous laser oscillation at two or more laser wavelengths. The design of the optical laser resonator cavity allows simultaneous laser action on two or more laser gain elements contained within the laser cavity. The design of the optical laser resonator cavity disclosed herein is generic and could be used in laser systems having a gain element with several fixed wavelength transitions such as Nd:YAG where the 1.06μ transition operates simultaneously with laser lines at 1.32μ, 1.34μ, 1.36μ, 1.42μ, 1.44μ and 0.942μ or in other continuously tunable laser systems such as Cr,Tm:YAG which tunes between about 1.9μ and about 2.1μ or an alexandrite laser which tunes between approximately 720 and 840 nm. Other exemplary laser systems are:

Cr:LiCAF which can be tuned about 720 nm and 850 nm;

Cr:LiSAF which can be tuned between approximately 760 nm and 1μ;

Cr:LiSGAF which can be tuned between approximately 800 nm and 900 nm;

Tm:YAG which can be tuned between about 1.87μ and about 2.16μ;

Ho:YAG which can be tuned between about 2.05μ and about 2.15μ, and between about 2.84μ and about 2.92μ; and Er:YAG which can be tuned between about 2.7μ and about 2.96μ.

It is clear in the case of either discretely tunable laser gain elements, such as Nd:YAG, or with continuously tunable gain media, such as Cr:LiSGAF, that gain elements of essentially the same gain material may be used in the laser resonator. That is to say, for example, with Nd:YAG a laser can be designed which operates simultaneously at 1.06μ and 1.32μ by using two Nd:YAG gain elements in separate arms of the laser resonator cavity. Alternatively, if simultaneous operation at 820 nm and 840 nm is desired two Cr:LiSGAF gain elements could be used in spatially separate parts of the cavity, one producing one of the two desired wavelengths, while the second Cr:LiSGAF crystal produces the other wavelength.

Note that an additional parameter that can be varied is the dopant density. That is, the two gain elements may consist of identical materials, but the concentration of activator ions in a solid state gain element, or the dye concentration in a given solvent, for example, can be adjusted to obtain the optimum emission performance at any specified wavelength. Therefore, if a specific active species concentration is ideal for one wavelength while a different concentration is ideal for another, then each gain element can be tailored by adjusting the concentration to produce to optimum emission at each desired wavelength. In addition, the host or solvent, for example, can be changed to optimize the performance of a given active specie at a given wavelength.

In the foregoing manner the problems associated with gain competition, by which two wavelengths compete for the population inversion in a single gain element, can be mitigated. Gain competition has been found to impose a limitation on simultaneous, multiple wavelength operation of a laser which uses a single gain element, see for example R. Scheps and J. F. Myers "Doubly Resonant Ti:sapphire Laser," *IEEE Photonics Technology Letters*, vol. 4, pp. 1–3, 1992. Therefore, stable cw or pulsed laser operation at two wavelengths simultaneously can be expected, for example, by using two gain elements of similar materials in the laser cavity. The gain elements will be located in a region of the resonator where the feedback path for each wavelength is spatially separate.

The optical laser resonator cavity can be resonantly pumped or flash pumped. The wavelength range over which the laser system operates in the case of a solid state laser is determined by the dopant or dopants used in the laser gain element host (crystalline of glass) as well as by the reflective coatings and transmission of the optical elements in the laser resonator cavity. As discussed above, some of the exemplary dopants ("activator ions") that can be used in solid state laser hosts are $Er^{3+}$, $Ho^{3+}$, $Nd^{3+}$, $Cr^{3+}$, $Ti^{3+}$ and $Tm^{3+}$. In addition, other activator ions which can be used are various ones of divalent $Mn^{2+}$, $Co^{2+}$ and $Ni^{2+}$, and quadrivalent $Cr^{4+}$ and $V^{4+}$ metal ions; trivalent actinides ($U^{3+}$); and divalent rare earth ions ($Sm^{2+}$, $Tm^{2+}$ and $Eu^{2+}$).

As mentioned above, the design of the optical laser resonator cavity disclosed herein is generic and can be used either in laser systems with discretely tunable or continuously tunable gain media. In addition, the design of the optical laser resonator cavity disclosed herein could be used with crystalline or noncrystalline amorphous or glass-like gain media as well as liquid gain media such as dye lasers or chelate lasers or gaseous gain media. The sum frequency generating process disclosed herein can be either Type I or Type II and can produce sun frequency wavelengths from the ultraviolet to the infrared. Furthermore, the sum frequency generating crystal can be critically phase matched or non-critically phase matched. The fundamental wavelengths can be line narrowed to produce line narrowed sum frequency generated output, or may be broadband, in which case a broadband sum frequency generated output is produced. The technique described herein is appropriate for both cw and pulsed laser operation.

Referring now to the drawings wherein like reference numerals designate identical or corresponding parts throughout the several views, FIG. 1A illustrates a first embodiment of this inventive concept. Tunable laser 11 contains three laser gain elements 12, 13 and 14. Laser resonator 15' is defined by optically aligned output mirror 19, fold mirrors 17, 18, 108 and 109, and end reflective coatings 12', 13' and 14' placed on exterior faces 12x of laser gain element 12, 13x of laser gain element 13, and 14x of laser gain element 14, respectively.

The interior region of laser resonator 15' is referred to as the "laser resonator cavity" and labelled 15 in FIG. 1. Fold mirrors 108, 109 and 18 form laser resonator cavity foci or waists 12w, 13w and 14w, respectively, in a region including the exterior faces 12x, 13x and 14x of laser gain elements 12, 13 and 14, respectively. Concave fold mirrors 108, 109 and 18 collimate the laser resonator radiation emerging from laser gain elements 12, 13 and 14, respectively, and reflect the collimated radiation along paths 108a, 109a and 18a, respectively, to laser prism 21.

Radiation emerging from laser prism 21 towards fold mirror 17 is collimated and the resonator mode for each simultaneously produced wavelength emerging from the respective gain element is spatially superimposed in this region of the laser resonator cavity. Concave fold mirror 17 is spaced with respect to concave partial output mirror 19 such that an additional resonator waist 111w in a non-linear crystal 191 may be located between mirrors 17 and 19. The exact location of the waist depends on the radii of curvature of mirrors 17 and 19 as well as on the separation between them. For identical radii of curvature and a separation equal to approximately twice the radius of curvature, the waist occurs at one-half the separation between mirrors 17 and 19.

By inserting a high dispersion prism 21 in laser resonator cavity 15, separate feedback paths are established for each wavelength produced by individual gain elements 12, 13 and 14, respectively. The use of a Brewster angle prism in minimum deviation for prism 21 provides low insertion loss while minimizing the amount of astigmatism introduced. The resonator mode is collimated as it passes through prism 21, and tuning may be achieved either by rotating prism 21 about the axis normal to the plane of FIG. 1 ("vertical axis"), or rotating either fold mirror 108, 109 or 18 about its corresponding vertical axis. In the case where Brewster angle prism 21 is rotated, all wavelengths change simultaneously while the separation between each wavelength emanating from each of feedback paths 112, 113 and 114 are held constant. By rotating either fold mirror 108, 109 or 18, only the wavelength along feedback path 112, 113 or 114, respectively, is changed while the other two wavelengths remain constant. Note that a similar, but less convenient approach to changing wavelengths along only one of the feedback paths can be accomplished by rotating gain element 12, 13 or 14 in conjunction with a rotation of the corresponding fold mirror. The inconvenience in this instance arises from the subsequent realignment that is required along the feedback path for which the wavelength was tuned.

An important feature of the resonator is that all wavelengths emerge simultaneously from output coupler 19 and are spatially overlapped. In addition, the spatial mode, shape and size for each wavelength are similar.

Optical source 212 is used in conjunction with lens 161 to end pump gain element 12, optical source 213 is used in conjunction with lens 162 to end pump laser gain element 13 and optical source 214 used in conjunction with lens 163 is used to end pump gain element 14. The pump flux from sources 212, 213 or 214 is shaped by lenses 161, 162 and 163, respectively, to match or overlap the laser resonator mode in gain elements 12, 13 and 14, respectively, as well as match, or coincide with, the mode waist 12w, 13w and 14w, respectively. In this manner, a gain aperture is established in each gain element ensuring high efficiency TEM$_{00}$ operation.

Pump sources 212, 213 and 214 may be any suitable optical sources, including cw lasers, pulsed lasers, laser diodes or incoherent sources such as flash lamps or incandescent lamps. For ease of understanding this inventive concept, optical sources 212, 213 and 214 will be described in terms of laser diodes and lenses 161, 162 and 163 may be lens combinations such as combinations of spherical and/or cylindrical lenses, as well as reflecting mirrors, such that the maximum power and efficiency is transferred from optical sources 212, 213 or 214 to laser gain elements 12, 13 and 14, respectively, while matching laser resonator mode waist 12w, 13w and 14w, respectively, and the divergence of the laser resonator cavity mode within gain elements 12, 13 and 14, respectively, determined by feedback paths 112, 113 and 114, respectively. This mode overlap provides the optimum pump efficiency for end pumping.

Optical excitation of laser gain elements 12, 13 and 14 is achieved using end pumping to improve the energy conversion efficiency, particularly when the pumping mode is oriented and focused for mode overlap, as disclosed herein. Exterior faces 12x, 13x and 14x of laser gain elements 12, 13 and 14 are coated to be simultaneously HR at the wavelengths along feedback paths 112, 112 and 114, respectively, and highly transmissive to the pump wavelength radiation emanating from pump sources 212, 213 and 214, respectively.

The diameter of laser resonator cavity waists 12w, 13w and 14w and pump waists 12p, 13p and 14p can be adjusted so that each pump waist matches or coincides with its respective cavity waist. This is accomplished by proper selection of the focal length of lenses 161, 162 and 163. Matching the waists 12w and 12p, 13w and 13p and 14w and 14p, in both size and position leads to the best pump and output efficiency for tunable laser 11 as well as establishing a gain aperture to select the lowest order TEM$_{00}$ spatial mode.

Dispersive Brewster angle prism 21 is oriented for minimum deviation to provide the least amount of astigmatism within the laser resonator cavity. The prism faces are uncoated and oriented at Brewster's angle with respect to the laser resonator cavity mode 15" at position 17a. The prism material should be a highly dispersive glass typical of the glasses that compose Faraday rotators. The glass is selected to have minimum absorption over a preselected range of wavelengths determined by the wavelengths provided along feedback paths 112, 113 and 114. Suitable materials for the prism are commercially available and may include such glasses as Kigre Corporation M-16 glass and Schott glass SF55.

Concave fold mirrors 108, 109, 18 and 17 are disposed off-axis. This will introduce a small amount of astigmatism within the laser resonator cavity mode. This astigmatism can be minimized by minimizing the angles between the incident and reflected rays at each mirror. While the illustration in FIG. 1 indicates relatively large angles at fold mirrors 18, 108 and 109, these angles are exaggerated in the figure for clarity, for ease in understanding, and distinguishing the various components of the embodiment illustrated in FIG. 1. In practice, the angles of incidence and reflection at mirrors 108, 109, 18 and 17 can be made extremely small, thereby reducing the astigmatism to a manageable, small amount.

The laser resonator cavity mode is collimated in the region between fold mirrors 108, 109 and 18 and concave fold mirror 17. Collimation is effected by proper selection of the radii of curvature of fold mirrors 17, 18, 108 and 109 and proper spacing between fold mirror 108 and exterior face 12x of laser gain element 12, fold mirror 109 and exterior face 13x of laser gain element 13, and fold mirror 18 and exterior face 14x of laser gain element 14. Brewster angle prism 21 is placed in the collimated region of the laser resonator cavity to improve the wavelength resolution and dispersion along feedback paths 112, 113 and 114.

Independent tuning of each output wavelength along feedback paths 112, 113 and 114 is obtained by angular adjustment of fold mirror 108, 109, or 18, respectively. The resulting tuning occurs only at the wavelength which is being fed back through prism 21 by the particular fold mirror that is being rotated. For example, rotating mirror 108 about the axis that vertically extends upward from the sheet of FIG. 1 will change the wavelength of feedback along feedback path 112 but will not affect the feedback wavelength along paths 113 or 114. Alternatively, prism 21 can be rotated to simultaneously tune the wavelengths fed back along paths 112, 113 and 114.

Typically, the shortest feedback wavelength, as illustrated in FIG. 1, is along path 114. The next longer wavelength is along feedback path 113 and the longest wavelength is along feedback path 112. The ordering of wavelengths along the various feedback paths is determined by the dispersion of the material used for laser prism 21. Dispersion refers to the change in the refractive index with wavelengths. Typically, the refractive index decreases as the wavelength increases. By Snell's law, then, the angle of refraction at the interface between prism face 21a and the feedback paths 112, 113 or 114 decreases as the refractive index of prism material 21 decreases. Clearly, if the refractive index of prism 21 were 1.0, the angle of refraction would be zero.

Laser prism 21 may be one or more prisms used in order to provide the appropriate dispersion within laser resonator cavity 15. As indicated above, laser output 103 emitted by tunable laser 11 contains all three wavelengths in this exemplary case simultaneously, spatially overlapped and collinear. The wavelengths desired for emission by tunable laser 11 determine the composition of gain media 12, 13 or 14, respectively. The most efficient operation will occur when the wavelength desired along path 112, for example, is near the peak wavelength for emission by laser gain element 12. If laser gain element 12 can produce a tunable laser emission, then the laser wavelength along feedback path 112 should correspond to a wavelength near the peak emission for laser gain material 12. If laser gain material 12 emits discrete laser wavelengths, then the wavelength along path 112 must correspond to one of the discrete emission lines.

With appropriate modifications, the design illustrated in FIG. 1 can be operated simultaneously at more than three wavelengths. These modifications are straightforward and require one additional gain element and one appropriately disposed concave fold mirror for each additional wavelength. The laser resonator modes representing additional wavelengths can be spatially matched to all other wavelengths operating simultaneously, and can be made collinear in the region between prism 21 and output mirror 19. Laser prism 21 should be fabricated from a material that does not significantly absorb at any of the wavelengths operating simultaneously in laser resonator cavity 15.

Line narrowing elements 126, 127 or 128 may be placed in feedback paths 112, 113 or 114, respectively, to narrow the linewidth of the emission at wavelengths corresponding to feedback paths 112, 113 or 114, respectively. Alternatively, line narrowing element 129 can be placed in the path where all wavelengths are collinear, as shown in FIG. 1, to produce simultaneous narrowing at all three wavelengths. In addition, means 12Q can be inserted in feedback path 112 to interrupt radiation along that feedback path, means 13Q can be inserted in feedback path 113 to interrupt radiation along feedback path 113, and means 14Q can be inserted along feedback path 114 to interrupt radiation along feedback path 114. Means 12Q, 13Q and 14Q can be optical shutters, for example, or electrooptic or acoustooptic Q-switches. Insertion of interrupting means 12Q, 13Q or 14Q will lead to pulsed operation along feedback paths 112, 113 or 114, respectively. In this manner optical output at one or more wavelengths can be Q-switched. Alternatively, a single means for interrupting the feedback along all three paths simultaneously, 17Q, can be placed in the location where all three wavelengths are spatially collinear to provide that the output from all three gain elements may be simultaneously Q-switched.

It is important to note that the Q-switch build-up time, which is the delay between the time the means for interrupting radiation first opens and the time that a laser pulse is emitted, depends to a great extent on the optical gain within laser gain element 12, 13 or 14. Therefore, locating a single Q-switch 17Q, as shown in FIG. 1, will only be effective in producing simultaneous Q-switched outputs at all three wavelengths if the optical gain in each of elements 12, 13 and 14 is approximately equal. The gain in each element is a function of the pump intensity from pump source 212, 213 or 214 incident on gain elements 12, 13 and 14, respectively, and the stimulated emission cross-section at the desired emission wavelength of gain materials 12, 13 and 14. A matching of the gain achieves simultaneous emission of the Q-switched pulses from all three gain elements and can be obtained by appropriate adjustment of the pump intensity from pump sources 212, 213 and 214. In addition, the net gain for each gain element depends on the specific output wavelength that is fed back through that gain elements. In the absence of comparable gain in all three gain elements, Q-switching by means 17Q, for example, will still be effective but the pulses will emerge at different times.

Appropriate optical coatings on all reflective and transmissive elements contained within laser resonator cavity 15 are important for determining the wavelength range over which tunable laser 11 can operate. For optics contained in that part of the resonator where the wavelengths operating simultaneously are spatially separate, that is, the region between prism face 21a and exterior faces 12x, 13x, and 14x of gain elements 12, 13 and 14, respectively, the optical coatings on elements contained within each spatially separate path should have appropriate reflective or transmissive properties for the specific wavelength or wavelengths fed back along each respective path. However, optical elements between prism 21 and output mirror 19 must reflect radiation at all wavelengths operating simultaneously. Therefore optical elements contained within this region, where all wavelengths are spatially aligned and collinear, must have the desired reflective or transmissive properties for all wavelengths for which laser output is desired.

Two salient features of the laser resonator cavity design shown in FIG, 1 must be reemphasized. The first is that the laser resonator cavity mode can be divided into two regions: one region where the simultaneously operating wavelengths are spatially separated and another region where the simultaneously operating wavelengths are spatially superimposed and collinear. The region where the wavelengths are spatially separated extends from gain elements 12, 13 and 14 in the exemplary case shown and illustrated in FIG. 1 through fold mirrors 108, 109 and 18 and to laser prism 21. The region where the simultaneously operating wavelengths are spatially superimposed and collinear extends from laser prism 21 through fold mirror 17 and to output coupler mirror 19.

As has been made clear above, having two distinct regions in the laser resonator cavity, one where the wavelengths are spatially separate and the other where the wavelengths are collinear, provides important benefits. In the region where the wavelengths are spatially separated one wavelength can be modulated without affecting the other. This can be done, for example, by insertion of a shutter or an electrooptic or an acoustooptic Q-switch such as 12Q, 13Q or 14Q, illustrated in FIG. 1. In addition, operation at one wavelength can be enhanced by insertion of optical amplifiers in feedback paths 112, 113 or 114. Furthermore, the insertion of line narrowing elements such as 126, 127 or 128 in one wavelength path will narrow that wavelength without affecting the bandwidth of the other.

The importance of having a region where both wavelengths are spatially collinear and superimposed is that for operations such as intracavity sum frequency generation, where two wavelengths are summed in a non-linear crystal to produce a third, shorter wavelength, it is required that both wavelengths be spatially collinear throughout the non-linear crystal.

Another feature of laser resonator cavity 15 illustrated in FIG. 1 is that laser resonator cavity mode 15" is collimated in one region of laser resonator cavity 15 and focused in another region of laser resonator cavity 15. Referring to the exemplary case illustrated in FIG. 1, laser resonator cavity mode 15" is collimated between fold mirrors 17 and fold mirrors 108, 109 or 118, respectively. It is to be noted that in essence there are three separate laser resonator cavity modes illustrated in FIG. 1 corresponding to the three feedback paths 112, 113 and 114 illustrated in this exemplary case. The laser resonator mode is focused between fold mirror 17 and output mirror 19, as well as between gain element 12 and fold mirror 108, gain element 13 and fold mirror 109, and gain element 14 and fold mirror 18. Focus or waist 111w can be located approximately midway between fold mirror 17 and output mirror 19.

The importance of having a collimated region in laser resonator cavity 15 is that intracavity elements such as prism 21, etalons 126, 127 128 or 129, and birefringent tuners can be efficiently utilized. On the other hand, there are several reasons why it is important to provide a focused region in the laser resonator cavity. For end pumping, which is the technique by which laser gain elements 12, 13 and 14 are optically excited in this exemplary case, the highest efficiency and lowest threshold operation occurs when the beam waist within the gain element is small. A second advantage of having a focused region is that when intracavity elements are inserted, for example those that effect non-linear operations such as sum frequency generation, it is important to have a small beam waist near the location in the laser resonator cavity where the non-linear crystal is inserted. This is because the efficiency of sum frequency generation, which is an example of a non-linear operation, depends on the power density in the beam to the second power (quadratically).

Note that in FIG. 1, as indicated above, there are three laser resonator cavity modes operating simultaneously, one for each wavelength. Each of these modes has two waists, one at the exterior face of the gain element 12, 13 or 14, respectively, and one at position 111w, as illustrated in FIG. 1. The unique importance of waist 111w is that at this location all three wavelengths in this exemplary case come to a focus simultaneously thereby enhancing the power density and the efficiency of non-linear operations when non-linear crystal 191 is positioned as indicated in FIG. 1.

In addition, as mentioned earlier, establishing a waist at exit faces 12x, 13x and 14x of gain elements 12, 13 and 14, respectively, establishes gain apertures in each gain element as discussed above, thereby promoting operation in the lowest order spatial mode of the laser resonator cavity and obviating the need for the insertion of a lossy hard aperture for achieving low order spatial mode operation. A hard aperture was required to obtain the lowest order spatial mode in the Javan patent cited above.

Optionally, pump lasers 212, 213 and 214 can be laser diodes, aluminum gallium arsenide or indium gallium arsenide or aluminum gallium indium phosphide, or can be other cw laser sources such as a doubled Nd:YAG laser or a dye laser, for example, or any other laser source the output of which is absorbed by laser gain elements 12, 13 or 14. Alternately, pump sources 212, 213 or 214 can be incoherent sources or can be pulsed sources. In addition, laser gain elements 12, 13 or 14 can be any length. In general, the length of the gain elements is selected to provide adequate gain at the desired operating wavelength and adequate absorption of the pump optical power. In addition to adjusting the length of the gain element the concentration of the dopant material is adjustable in the case where gain elements 12, 13 and 14 are solid state gain elements.

As mentioned, non-laser sources such as arc lamps or cw filament lamps or flash lamps or other gas-filled lamps can be used to excite laser gain elements 12, 13 or 14. For pulsed excitation the output of the laser fabricated in accordance with this inventive concept will be pulsed. For cw excitation, the operation will be either cw or pulsed depending on whether elements for interrupting cw operation are inserted into the laser resonator cavity. Multifrequency operation in the pulsed mode can occur either with simultaneous pulses or sequential pulses at each wavelength, as discussed above.

Gain elements 12, 13 and 14 can be the same material or different materials. Furthermore, these gain elements can be solid state gain elements, semiconductor gain elements, gaseous or liquid gain elements or any combination thereof. The concentrations of the active specie in gain elements 12, 13 or 14 can be similar or different depending on the desired mode of operation and the specific wavelengths desired in output 103.

For intracavity sum frequency generation only two fundamental wavelengths operating simultaneously are required. Therefore, one feedback path, for example 114, can be eliminated along with fold mirror 18, gain element 14, pump source 214 and pump optics 163. In this case, wavelengths along feedback paths 112 and 113 represent the two fundamental wavelengths. Non-linear crystal 191, which is designed for sum frequency generation (SFG) of the wavelengths along paths 112 and 113, is placed at waist 111w, as indicated in FIG. 1.

In this case, both fundamental wavelengths have nearly identical spatial modes and are superimposed and collinear within laser crystal 191. In addition, the power density at both fundamental wavelengths is extremely high, leading to efficient intracavity sum frequency generation at the sum frequency generated wavelength. Output mirror 19 in this exemplary case can be coated to be highly reflective for both fundamental wavelengths while simultaneously being highly transmissive for the sum frequency generated wavelength. Therefore, output 103 will contain only the sum frequency generated wavelength while the intracavity flux at the fundamental wavelengths will be significantly enhanced.

Note that for Type II intracavity SFG the polarization of the two fundamental wavelengths must be orthogonal to one another. In principle it is relatively straightforward in some cases to design gain elements 12 and 13 to produce orthogonal polarizations with respect to one another along feedback paths 112 and 313. This can be accomplished by the use of polarizing Brewster elements, or orientation of the crystalline axes for anisotropic laser solid state gain elements, for example. However, the reflection of one of the polarizations by Brewster faces 21a and 21b of Brewster angle laser prism 21 will reduce the efficiency of operation at the wavelengths for which the polarization is oriented perpendicular to the plane of incidence.

A more efficient manner of obtaining orthogonal polarization orientation at non-linear crystal 191 is through the insertion of polarization rotation means 15P, as illustrated in FIG. 1. Polarization rotation means 15P can be a multiple order waveplate, for example, which rotates the polarization of the wavelength along feedback path 112 by an integral number of full waves while rotating the polarization of the wavelength along feedback path 113 by an integral number of half-waves. Resonator radiation reflected by fold mirror 17 towards polarization means 15P will have the orientation of the polarization of the two waves parallel for best efficiency. This radiation will emerge from polarization rotation means 15P with the polarization orientation of the two wavelengths perpendicular. This orientation is maintained as the radiation enters non-linear crystal 191.

In addition, the orthogonal orientation of the two polarizations has not changed by non-linear crystal 191 and continues no be maintained after reflection by output mirror 19. As the fundamental radiation reflected from output mirror 19 back towards fold mirror 17 passes through non-linear crystal 191, the orthogonal orientation of the polarization is maintained. Therefore, in both passes through non-linear crystal 191 the fundamental wavelengths are orthogonally polarized. Upon entering waveplate 15P in the direction towards fold mirror 17, however, the orthogonal polarization is once again realigned for parallel orientation. As the resonator radiation is transmitted in the direction of prism 21 the parallel, high efficiency orientation of the two wavelengths is once again established.

It is important to reemphasize that the three exemplary laser gain elements illustrated in FIG. 1 are for illustration purposes only. Fewer or more gain elements can easily be accommodated in this inventive concept for intracavity sum frequency generation. As indicated above, only two gain elements are required for sum frequency generation.

An example of intracavity sum frequency generation using the inventive concept illustrated in FIG. 1 can be given for the case of sum frequency at 808 nm and 1.06µ to generate 459 nm blue radiation. As discussed above only two gain elements are required and gain element 14, fold mirror 18, pump source 214 and pump source optics 163 can be eliminated. For this example cw intracavity sum frequency generation will be discussed; however, it is to be understood that pulsed, cw or repetitively Q-switched sum frequency generation can easily be accommodated by this inventive concept as discussed above.

Gain element 12, as illustrated in FIG. 1, represents the shorter wavelength, 808 nm. Gain element 12 can be the solid state laser gain material Cr:LiSGAF, for example. Laser gain element 13 must operate at 1.06µ and can be, for example, Nd:YAG. Laser pump source 212 can be, for example, one or more laser diodes emitting in the wavelength range of 620 to 680 nm and can be AlGaInP laser diodes. Pump source 213 can be, for example, one or more laser diodes emitting at 808.5 nm and can be AlGaAs laser diodes. In this exemplary case non-linear crystal 191 is a Type II KTiOPO$_4$ (KTP) laser crystal cut along the crystallographic XYZ axes for non-critically phase matched sum frequency generation at room temperature. Polarization rotation means 15P can be a multiple order waveplate which rotates the polarization of wavelength 808 nm by an integral number of full wave rotations and the polarization of the 1.06µ wavelength by an integral number of half-wave rotations. The output 103 will be at 459 nm. Output mirror 19 is coated HR at 808 nm and 1.06µ and HT at 459 nm, while fold mirror 17 is coated HR at 808 nm and 1.06µ.

Prism 21 in this exemplary case may be made of Schott glass SF55. The important criteria for the prism material in this exemplary case is that it should have high dispersion and extremely low absorption at both 808 nm and 1.06µ. Dispersion refers to the refractive index variation with optical wavelength. Many glasses which satisfy the condition of high dispersion also have high absorption losses, particularly at 1.06µ. While numerous glasses may be satisfactory for this application, Schott SF55 glass is used in this exemplary case because it is readily available in the high optical quality required for intracavity laser operation. In addition, it has high dispersion and has very low absorption losses at both 808 nm and 1.06µ. This glass has an Abbe value of 26.95 which indicates high dispersion and an absorption of less than 0.1% per centimeter at both 808 nm and 1.06µ. Prism 21 has Brewster cut optical faces and is oriented for minimum deviation. The optical faces of prism 21 are optically polished and oriented so that when prism 21 is in minimum deviation, the angle that laser resonator cavity mode 15" makes with laser prism face 21b is Brewster's angle.

Note that for efficient intracavity sum frequency generation the optical power along feedback paths 112 and 113 should be approximately equal. As discussed above, this can be obtained by taking into account the stimulated emission cross-sections for gain elements 12 and 13 at the desired output wavelengths and adjusting the dopant densities (in the case of solid state materials), the length of the gain elements and the optical pump power from pump sources 212 and 213, respectively. The dependence of the power at the sum frequency generated wavelength, $P_3$, depends on the product $P_1 \times P_2$, where $P_1$ and $P_2$ are the powers at the two fundamental wavelengths. From simple calculus it can be shown that when $P_1 + P_2$ is constant, the product $P_1 \times P_2$ is maximized when $P_1 = P_2$. Put another way, for a given pump power there is a greater benefit to dividing the pump power in such a manner that the intracavity powers along feedback paths 112 and 113 are approximately equal, than the case where one wavelength has much greater intracavity power than the other.

Referring once again to the embodiment illustrated in FIG. 1, note that gain elements 12, 13 or 14 can be of the same material. This is desirable in the case, for example, when the wavelengths that are desired to oscillate simultaneously cannot be achieved in a dual wavelength laser using a single gain element, see for example R. Scheps and J. F. Myers "Doubly Resonant Ti:sapphire Laser," *IEEE Photonics Technology Letters*, vol. 4, pp. 1–3, 1992. Because the relative stimulated emission cross-sections at both wavelengths are not comparable, simultaneous dual wavelength operation may not be possible. This situation may occur even though each wavelength can lase in the gain element when the other is not present. That is to say, when the stimulated emission cross-section at two wavelengths is substantially different, it is difficult to achieve simultaneous two wavelength operation in a given gain element in spite of the fact that the gain element has gain at both wavelengths.

By utilizing the same gain material in gain elements 12 and 13, for example, there is no gain competition in either gain element due to the presence of another wavelength since feedback paths 112, 113 and 114 are completely separate. For example, although a Ti:sapphire gain element has gain at both 800 nm and 1.06µ, it is generally difficult to obtain simultaneous two-wavelength operation in Ti:sapphire at these wavelengths in a single gain element. However, if both gain elements 12 and 13 are Ti:sapphire, and the laser resonator cavity is oriented so that exemplary Ti:sapphire gain element 12 operates near the peak stimulated emission at 808 nm while exemplary Ti:sapphire gain element 13 is aligned to operate at the much lower stimulated emission cross-section corresponding to 1.06μ, simultaneous operation at these two wavelengths can be achieved in this inventive concept.

The output 103 will be diverging as a consequence of the focused resonator mode between fold mirror 17 and output mirror 19. For some applications it may be desirable to have a collimated output. While one option for collimating the output is to use an external lens, a second option is illustrated in FIG. 1 in which concave mirror 19 is now a fold mirror whose radius of curvature and position with respect to waist 111w collimates the output in the direction of partial reflector flat output mirror 19'. Therefore, the output 103' is collimated as it exits the laser resonator cavity, which in this case extends beyond mirror 19 to include mirror 19'. The extended region of laser resonator cavity 15, collimated output 103' and output mirror 19' are shown in phantom in FIG. 1.

Figure 2:
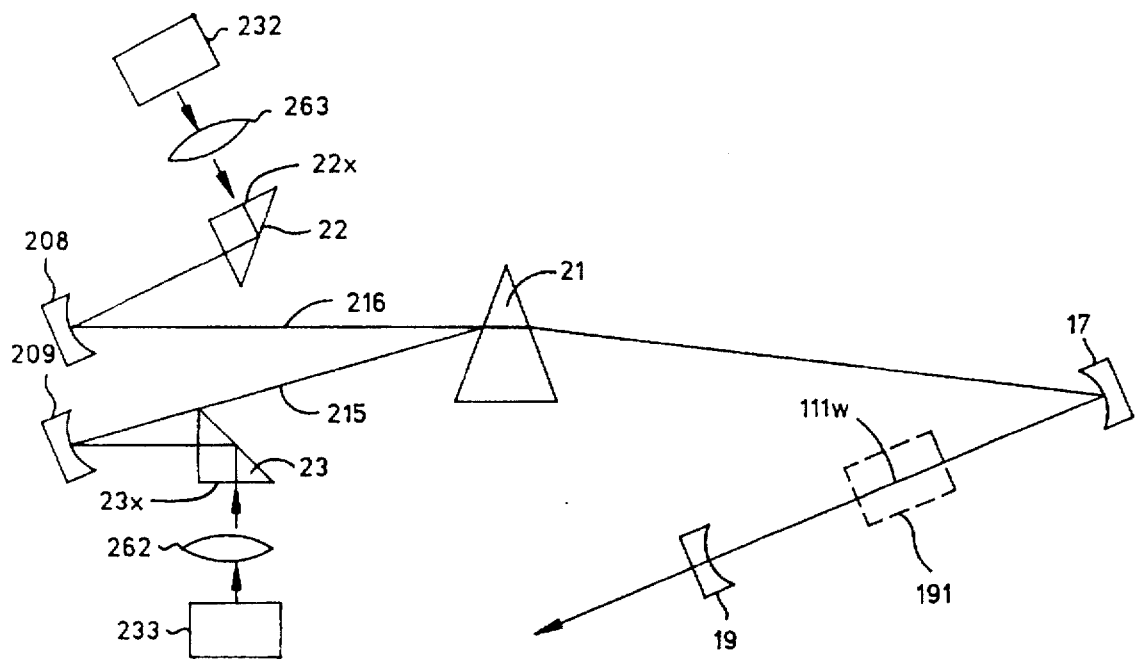
FIG. 2 represents a second embodiment of the invention.

A second embodiment of this inventive concept is illustrated in FIG. 2. In this exemplary case two gain elements 22 and 23 are end pumped by optical sources 232 and 233, respectively, and two wavelengths are produced simultaneously. For mode matching the pump radiation with the resonator radiation optical lenses 263 and 262 are used for pump sources 232 and 233, respectively. Gain elements 22 and 23 are shaped as right angle isosceles prisms so that the fold angle that laser resonator modes 215 and 216 make with fold mirrors 208 and 209, respectively, is substantially reduced relative to that shown in the embodiment illustrated in FIG. 1. As indicated above, since off-axis use of spherical mirrors introduces astigmatism to the cavity, reducing the angle of incidence at fold mirrors 208 and 209 reduces the amount of astigmatism.

The use of a laser gain element in the form of a right angle isosceles prism has been previously described, see for example R. Scheps and J. F. Myers, "Laser diode-pumped internally folded Nd:YAG laser," *IEEE Journal of Quantum Electronics*, 28, 1640 (1992). This gain element has one "internal fold" and is useful for scaling applications using laser diode pumping. Resonator modes are said to be "folded" when they are reflected at a non-normal angle of incidence by a reflective element contained within the resonator cavity. The concept of an internal fold simply refers to the case where the reflection occurs within the gain element and is caused by a reflection from a polished surface of the gain element. The internal fold in the case of the right angle prism refers to the reflection of the laser resonator mode at the prism hypotenuse which provides a 90° deviation of the resonator mode within the gain element. The right angle isosceles prism gain element is one example of a class of gain elements in which the resonator mode is internally folded by reflection from one or more faces of the gain element. Another example of this type of gain element one that is shaped as a penta-prism, see for example R. Scheps and J. F. Myers, "Efficient, scalable, internally folded Nd:YAG laser end-pumped by laser diodes," *IEEE Journal of Quantum Electronics*, 29, 1515 (1993). Generally speaking, these multi-faceted gain elements may be referred to as "prisms".

The exterior faces of gain elements 22 and 23, 22x and 23x, respectively, are coated no be simultaneously highly transmissive for the pump radiation from optical sources 232 and 233, respectively, and highly reflective for the wavelengths along feedback paths 212 and 213, respectively. Fold mirrors 208 and 209 have radii of curvature and are spaced to create resonator waists 22w and 23w at exterior faces 22x and 23x, respectively, of gain elements 22 and 23, respectively, for efficient end pumping of each gain element. In addition fold mirrors 208 and 209 collimate the laser resonator modes between each respective fold mirror and fold mirror 17. Fold mirror 17 has a radius of curvature and is spaced to create a waist 111w between fold mirror 17 and output mirror 19. As indicated and discussed in the embodiment illustrated in FIG. 1, a non-linear sum frequency generating crystal can be placed at the waist 111 as indicated by 191 in FIG. 2. A waist as referred to herein and before is defined as the focal point for a Gaussian beam. When there is a single waist, the beam diameter at the waist location is smaller than at any other location in the beam.

In the illustration shown in FIG. 2 rotating prism 21 about the axis normal to the plane of FIG. 2 ("vertical axis") tunes both wavelengths simultaneously while maintaining a constant separation between the two wavelengths. Alternatively, rotating fold mirror 208 or 209 about its vertical axis tunes the wavelength along feedback path 212 or 213, respectively, while leaving the other wavelength constant. Note also that additional gain elements can be inserted into the embodiment shown in FIG. 2 to obtain additional wavelengths in this inventive concept.

Figure 3:
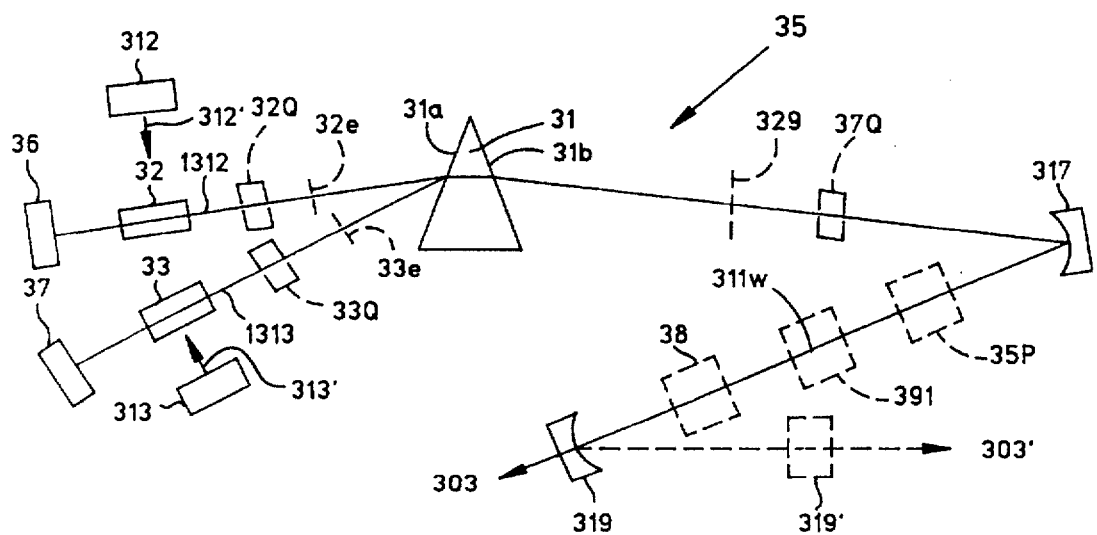
FIG. 3 represents a third embodiment of the invention.

A third embodiment of this inventive concept is illustrated in FIG. 3. This design is particularly appropriate for side pumped optical gain elements. Side pumping refers to a means for optical excitation in which the optical pump power is directed towards the laser gain element along an axis transverse to the laser resonator axis as it passes through the laser crystal. In this embodiment two laser gain elements 32 and 33 are illustrated to produce two simultaneously oscillating wavelengths; however, it is to be understood that in this inventive concept additional wavelengths operating simultaneously can be obtained by adding additional gain elements in accordance with this inventive concept.

Gain elements 32 and 33 are optically excited by optical pump sources 312 and 313, respectively, located so that the optical pump power 312' and 313' from each pump source is incident upon laser gain element 32 or 33 transverse to laser resonator mode axes 1312 and 1313, respectively. Optical sources 312 or 313 can be laser sources, laser diodes, flash lamps, incandescent lamps or any other suitable optical pumping source for exciting laser emission in gain elements 32 and 33. Feedback mirrors 36 and 37 may be flat or curved, concave or convex as appropriate to minimize thermal lensing in laser gain elements 32 and 33. Fold mirror 317 is appropriately disposed to create a laser resonator cavity waist 311w between fold mirror 317 and output mirror 319. Laser prism 31 is disposed in the laser resonator cavity to provide wavelength dispersion and create separate feedback paths 1312 and 1313. In addition, a line narrowing element 32e or 33e can be disposed along feedback paths 1312 or 1313, respectively, to reduce the bandwidth of laser wavelengths fed back along paths 1312 and 1313, respectively. Alternatively, line narrowing means 329 can be inserted in the laser resonator to simultaneously narrow the bandwidths of all wavelengths operating simultaneously in this exemplary case.

Means for interrupting the feedback at one or more wavelengths can be inserted into the cavity. Element 32Q can be a shutter or an electrooptic or acoustooptic Q-switch, for example, and is inserted in feedback path 1312 for the purpose of interrupting radiation along path 1312. Similarly, interrupting means 33Q is disposed along feedback path 1313 for interrupting feedback along path 1313. Alternatively, means 37Q can be disposed in the cavity to simultaneously interrupt feedback along both paths 1312 and 1313 in this exemplary case.

A polarization rotating means 35P can be inserted in laser resonator cavity 35 to simultaneously rotate the polarization of all wavelengths operating in laser resonator cavity 35. Laser prism 31 is a Brewster angle prism disposed in the cavity for minimum deviation. The Brewster faces of prism 31, 31a and 31b, establish a linearly polarized laser resonator mode within laser resonator cavity 35. A non-linear crystal 391, which for example may be a sum frequency generating crystal, can be disposed in the cavity at laser resonator waist 311w. In addition, an astigmatism compensating means 38 can be disposed within laser resonator cavity 35 to compensate for astigmatism caused by the off-axis use of fold mirror 317. However, it is to be noted that the angle of incidence at fold mirror 317 can be relatively small, thereby introducing little astigmatism in the laser resonator mode.

Output 303 through mirror 319 in general will be diverging as discussed above in relation to the embodiment shown in FIG. 1. To produce a collimated output beam, mirror 319 can be a concave fold mirror which collimates the laser resonator mode between fold mirror 319 and flat output mirror 319' to produce a collimated output 303' through output mirror 319'. In this case the laser resonator cavity is extended beyond fold mirror 319 to output mirror 319'. The extended part of laser resonator cavity 35, output coupler 319' and collimated output 303' are shown in phantom in FIG. 3.

A laser in accordance with this inventive concept has a wide range of applications including various medical, sensing, pollution monitoring, laser ranging, aircraft wind speed and wind shear measurement applications, surveillance and communications.

It should therefore be readily understood that many modifications and variations of the present invention are possible within the purview of the claimed invention. It is therefore to be understood that within the scope of the appended claims, the invention may be practiced otherwise than as specifically described.

We claim:

1. A laser for emitting at least two wavelengths within a preselected range of wavelengths that reduces the problems associated with gain competition comprising:

a resonator for said at least two wavelengths within a preselected range of wavelengths defining a laser resonator cavity, said resonator including at least two highly reflective end elements, at least one highly reflective concave fold mirror element and a output coupler reflective element arranged to form a reflective path defining said laser resonator cavity therebetween;

a dispersing prism disposed in said laser resonator cavity between said concave fold mirror and said at least two highly reflective end elements to spatially disperse said at least two wavelengths, said dispersing prism and said at least two highly reflective end elements being aligned in a manner to define a discrete end portion of a separate one of at least two resonant paths in said laser resonator cavity, each separate one of two resonant paths being for a discrete one of said at least two wavelengths in said preselected range of wavelengths;

at least two laser gain elements each being disposed in a separate said discrete end portion of a separate one of at least two resonator paths in said laser resonator cavity, and each of said two gain elements being aligned to emit at least a discrete one of said at least two wavelengths; and means for optically exciting said laser gain elements in a side pumping mode to emit an optical emission that includes said at least two wavelengths in said preselected range of wavelengths at predetermined relative magnitudes thereof.

2. The laser of claim 1 in which said laser gain element is substantially in the form of a cylindrical laser rod having a longitudinal dimension along a cylinder axis and said means for optically exciting is a flash lamp having a long dimension along a first axis which is substantially parallel to said cylinder axis of said cylindrical laser rod for side pumping said cylindrical laser rod along the long dimension of said laser rod.

3. The laser of claim 2 further including a means disposed within said laser resonator cavity for producing sum frequency generation.

4. A laser for generating a laser beam having a plurality of wavelengths comprising:

a laser resonator for resonating said laser beam;

a plurality of gain elements arranged in separate optical paths within said resonator for generating a laser output for each of said plurality of wavelengths;

a beam splitter/combiner operably coupled to said plurality of gain elements for combining said laser outputs from said plurality of gain elements to form said laser beam; and a non-linear gain element arranged within said laser resonator operably coupled to said plurality of gain elements for generating an additional laser beam at a sum frequency from at least two of said laser outputs.

\* \* \* \* \*